No. 650,769. Patented May 29, 1900.
G. C. AVERY.
CLEVIS.
(Application filed Nov. 29, 1899.)
(No Model.)
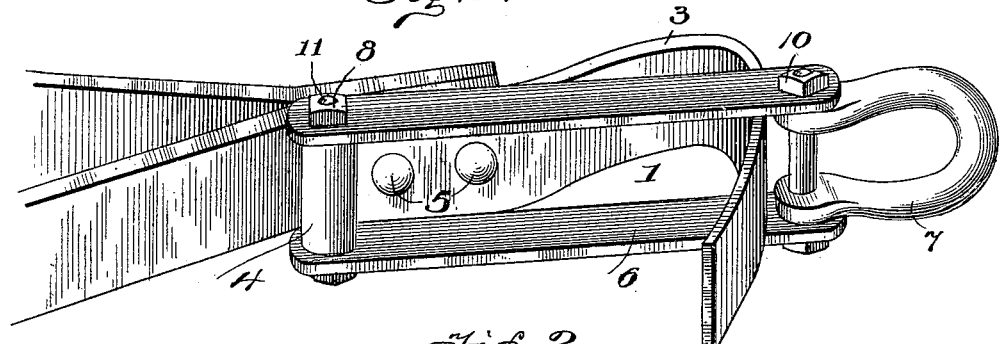
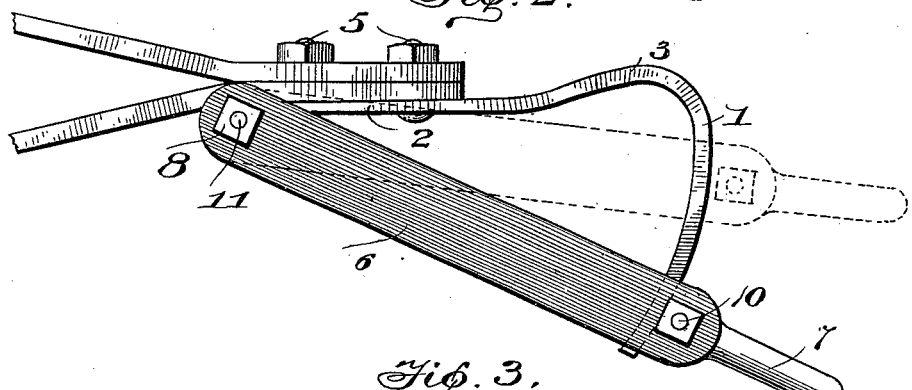
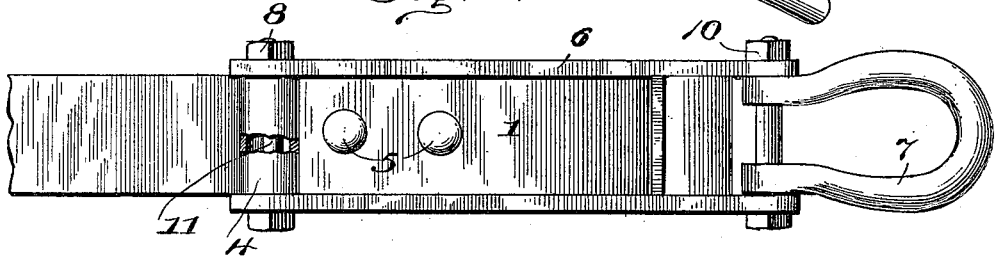
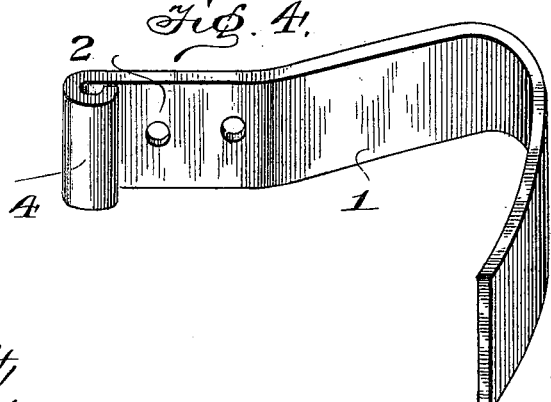
Witnesses
F. S. Belt,
A. H. Fuss.
Inventor
George C. Avery
by Mason Fenwick Lawrence
his Attorneys

UNITED STATES PATENT OFFICE.

GEORGE C. AVERY, OF LOUISVILLE, KENTUCKY, ASSIGNOR TO THE B. F. AVERY & SONS, OF SAME PLACE.

CLEVIS.

SPECIFICATION forming part of Letters Patent No. 650,769, dated May 29, 1900.

Application filed November 29, 1899. Serial No. 738,699. (No model.)

*To all whom it may concern:*

Be it known that I, GEORGE C. AVERY, a citizen of the United States, residing at Louisville, in the county of Jefferson and State of Kentucky, have invented certain new and useful Improvements in Clevises; and I do hereby declare the following to be a full, clear, and exact description of the invention, such as will enable others skilled in the art to which it appertains to make and use the same.

My invention relates to devices for regulating the side draft of cultivating implements; and it consists of a piece or member attached to the forward end or beam of the implement and formed with a groove or segmental portion and a clevis pivoted to said member adapted to be adjusted to the desired position and readily secured in said position, as will be hereinafter described.

In the accompanying drawings, Figure 1 is a perspective view of my improved device. Fig. 2 is a top plan view of the same. Fig. 3 is a side elevation thereof, and Fig. 4 is a perspective view of the member having the segmental portion.

1 in the drawings represents the piece or member which is attached to the beam or draft end of a cultivating implement. This piece or member is formed with an approximately-straight portion 2 and an outwardly-curved or segmental portion 3 and has its end bent upon itself to form an eye 4. This piece or member is secured to the beam or draft end of a cultivating implement by means of bolts 5, as shown. An arm 6, carrying a clevis 7, is pivoted at its rear end to the member or piece 1 by means of a bolt 7, which passes through the eye of the said member or piece, said bolt being threaded to receive a nut 8, as shown. The arm 6 consists of an upper and lower plate, which rest on the upper and lower edges of the segmental piece or member 1 and inclose or embrace the said member, as shown. A clevis proper, 9, is secured between the upper and lower pieces of the arm 6 by means of a bolt which passes vertically through said upper and lower pieces and through the clevis. This bolt is threaded and receives a nut 10, as shown. It is obvious that by loosening the nut 10 the arm 6, carrying the clevis proper, 9, can be moved to any point desired on the segmental portion of the piece or member 1 and by again tightening the said nut 10 the arm and clevis carried thereby can be secured in said position.

The device is very simple in construction and yet perfect in its operation and can be applied to cultivating implements with very little labor.

Having now described my invention, what I claim as new, and desire to secure by Letters Patent, is—

1. A device for regulating the side draft of implements comprising in its construction a member or piece, which is secured to the draft end of the implement and which is formed with a curved or segmental portion, and an arm pivoted at its rear end to said member and carrying at its outer end, a clevis, which latter is secured in position by means of a threaded bolt and nut, said arm comprising upper and lower pieces which rest upon the upper and lower edges of the segmental piece or member and are adapted to be clamped thereon by means of the bolt connecting the clevis to the said arm, the construction and arrangement being such that the clevis can be adjusted to any desired position on the segmental portion of the member by loosening the said bolt and sliding the arm carrying the clevis to any desired position and securing it in the adjusted position, substantially as described.

2. A device for regulating the draft of implements comprising in its construction a piece or member formed with a curved or segmental portion and provided at its rear end with an eye, said piece or member being adapted to be secured to the draft end of a cultivating implement, and an arm comprising an upper and a lower plate, which arm is pivoted to the member by means of a bolt, passing through the eye thereof, and a clevis secured between the outer ends of the arm-plates, said arm being adapted to any desired point on the piece or member and secured in position thereon, substantially as described.

3. A draft attachment for cultivators comprising an attaching member, said attaching member being bent at one end to form a segment, an arm pivotally secured to the said member, and means for clamping the said arm at different points on the said segment to vary the draft, substantially as described.

In testimony whereof I hereunto affix my signature in presence of two witnesses.

GEORGE C. AVERY.

Witnesses:
S. E. WIARD,
O. G. KANSTON.